US005892200A

United States Patent [19]

Kendall et al.

[11] Patent Number: 5,892,200

[45] Date of Patent: Apr. 6, 1999

[54] TRANSFER PORT SYSTEM

[75] Inventors: John S. Kendall, East Grinstead; Andrew R. Baxter, Milnthorp, both of England; Charles R. Whitman, Augusta, Mich.

[73] Assignee: The BOC Group, Inc., New Providence, N.J.

[21] Appl. No.: 716,007

[22] Filed: Sep. 19, 1996

[51] Int. Cl.[6] ................................ H05B 1/00; B25J 21/02

[52] U.S. Cl. ........................... 219/201; 217/109; 454/187

[58] Field of Search .................................... 118/724, 725, 118/729, 733, 50.1; 114/201 R; 219/243, 214, 218, 62, 535; 217/109; 422/22, 23, 63, 295, 296, 297, 307; 414/935, 937, 939, 147; 49/401; 296/210, 212, 216, 218, 222–224; D23/269; 454/187

[56] References Cited

U.S. PATENT DOCUMENTS

| | | | |
|---|---|---|---|
| 3,753,829 | 8/1973 | Freeman | 156/367 |
| 3,985,994 | 10/1976 | Eloranta et al. | 219/201 |
| 4,498,701 | 2/1985 | Queveau | 296/216 |
| 5,110,399 | 5/1992 | Yoshida et al. | 156/515 |
| 5,139,459 | 8/1992 | Takahashi et al. . | |
| 5,391,035 | 2/1995 | Krueger | 414/217 |
| 5,425,400 | 6/1995 | Francis . | |

FOREIGN PATENT DOCUMENTS

| | | |
|---|---|---|
| 0 450 700A1 | 9/1991 | European Pat. Off. . |
| 0 662 373 A | 12/1995 | European Pat. Off. . |
| 2 262 786 | 6/1993 | United Kingdom . |

*Primary Examiner*—Teresa Walbery
*Assistant Examiner*—Thor S. Campbell
*Attorney, Agent, or Firm*—David M. Rosenblum; Salvatore P. Pace

[57] ABSTRACT

A transfer port system to allow material to transfer between two dockable sterile environments. Two doors provide access to the sterile environments. A peripheral flange frames one of the doors while another peripheral flange forms the opening to the other sterile environment. Doors connect to one another, when the sterile environments are docked, and then move as a unit into the one sterile environment in order to allow the material transfer. Outer and inner gaskets seal the sterile environments and with the peripheral flanges form an interface between the sterile environments during material transfer. The portions of the gaskets and peripheral flanges that were exposed to the unsterile ambient prior to docking are actively heated in order to maintain sterility during the time when the sterile environments are docked and prior to the time that the doors are moved to the open position. The doors can be connected to one another prior to their opening by vacuum. The vacuum has an added benefit of drawing contaminants from between the doors.

10 Claims, 5 Drawing Sheets

TRANSFER PORT SYSTEM

BACKGROUND OF THE INVENTION

The present invention relates to a transfer port system to allow material transfer between two sterile environments in which the two sterile environments dock with one another during the material transfer. More particularly, the present invention relates to such a transfer port system in which doors provided for access to the two sterile environments are sealed by gaskets. Even more particularly, the present invention relates to a transfer port system in which gasket surfaces are heated to maintain sterile conditions during the material transfer between the sterile environments.

The use of sterile manufacturing environments has become increasing more important in many industrial processes. In this regard, the electronic and pharmaceutical industries have a particularly low tolerance for inorganic and organic contaminants. An example of processing that must be conducted in aseptic conditions concerns the preparation of medicants, solutions, and suspensions within the pharmaceutical industry by freeze drying. In accordance with such production, the product is loaded into vials under sterile conditions and is then transported in an transporter isolator to a freeze dryer. The transporter isolator is a sterile vehicle for the transport of vials and docks at the end of its journey with the freeze dryer for the transfer of vials onto the shelves of the freeze dryer. After the docking of the transporter isolator and the freeze drier and the transfer of the vials, the product is freeze dried and the vials are stoppered within the freeze drier. Between freeze drying operations, the freeze dryer can be sterilized with steam, hydrogen peroxide vapor solutions and the like so that its sterility is maintained.

As can be appreciated, during the transfer of vials into the freeze dryer from the transporter isolator, a sterile interface must be maintained between the transporter isolator and the freezer dryer chamber. The same problem exists in any transfer port system in which material transfer is to be accomplished between two sterile environments. The difficulty in the maintenance of the sterile interface is that components of the transfer port system have been exposed to unsterile ambient conditions prior to linkage or docking of the two sterile environments. This problem is compounded by imperfections in the mating of components of the transfer port system. In order to maintain sterility at the interface, heat is applied to the components that have been exposed to the unsterile environment. Such sterilization is not without problems due to the thermal mass of the components of the transfer port system and the attendant required heating time to attain an assurance of a sterile condition.

As will be discussed, the present invention provides a transfer port system that is designed such that its components can be rapidly heated in order to maintain the necessary sterile interface between sterile environments during material transfer. Additionally, the transfer port system is designed to accommodate slight misalignments between its components.

SUMMARY OF THE INVENTION

The present invention provides a transfer port system to allow material transfer between two sterile environments. The two sterile environments have a docked position, adjacent to one another, to allow the material transfer, and an undocked position, separated from one another. A door means is provided for the transfer port system in order to access the two sterile environments. The door means includes first and second doors having a closed position closing the two sterile environments and an open position with the first and second doors connected to one another and situated within one of the two sterile environments. In the open position of the two doors, material transfer is allowed between the two sterile environments. First and second peripheral flanges are connected to the first door and the other of the two sterile environments, respectively, and are positioned to initially contact one another when the two separate sterile environments are in the docked position. The first and second peripheral flanges have matched abutting surfaces aligned with and in contact with one another during the initial contact of the first and second peripheral flanges. Additionally, lateral sealing surfaces are connected to the matched abutting surfaces and are shaped to form two opposed, outer and inner peripheral grooves when the matched abutting surfaces are in contact. Outer and inner gaskets are provided with sealing portions configured to seat within the outer and inner grooves and to seal against the lateral surfaces of the first and second peripheral flanges during the initial contact thereof. The outer gasket is connected to the one of the two sterile environments and the inner gasket is connected to the second door. As a result, when the first and second doors are in the closed position, the two separable environments are sealed by the outer and inner gaskets at the first and second peripheral flanges, respectively. When the two sterile environments are in the docked position, with the first and second doors in the open position, the outer gasket peripherally seals both of the two'sterile environments at the second peripheral flange and the inner gasket peripherally seals the first and second doors at the first peripheral flange. A heating means is provided for heating the first and second peripheral flanges during their initial contact. Such heating sterilizes the lateral sealing surfaces, the matched abutting surfaces and the sealing portions of the outer and inner gaskets. A connection means is provided for connecting the first and second doors to one another when the sterile environments are in the docked position. This allows movement of the first and second doors into the open position as a unit.

As can be appreciated, when the two sterile environments are in the undocked position, part of the sealing portions of the outer and inner gasket are exposed to unsterile conditions. Additionally, the matched abutting surfaces are also exposed. In order to assure the sterile transfer of material, all of these foregoing exposed surfaces are heated to sterile temperatures during the initial contact of the first and second peripheral flanges. Since the sealing surfaces of the gaskets are in fact captured between the two peripheral flanges, light misalignments can be tolerated between the peripheral flanges and gaskets. Moreover, since the sealing is effected between gasket and peripheral flange, the peripheral flanges can be connected to the environments and doors in an insulated manner to reduce the thermal mass of the system that must be heated to sterile temperatures.

BRIEF DESCRIPTION OF THE DRAWINGS

While the specification concludes with claims distinctly pointing out the subject matter that Applicants regard as their invention, it is believed that the description of the invention will be better understood when taken in connection with the accompanying drawings in which:

DETAILED DESCRIPTION

With reference to FIGS. 1–4 a transfer port system 1 in accordance with the present invention is illustrated to transfer material between sterile environments 2 and 3 which are respectively, a freeze drier and a transporter isolator. Vials 4 constitute the sterile material to be transferred between the two environments. This foregoing description of the environment of the transfer port system of the present invention is for exemplary purposes only and is not in and of itself meant to limit the present invention to any specific industrial application.

Figure 2:
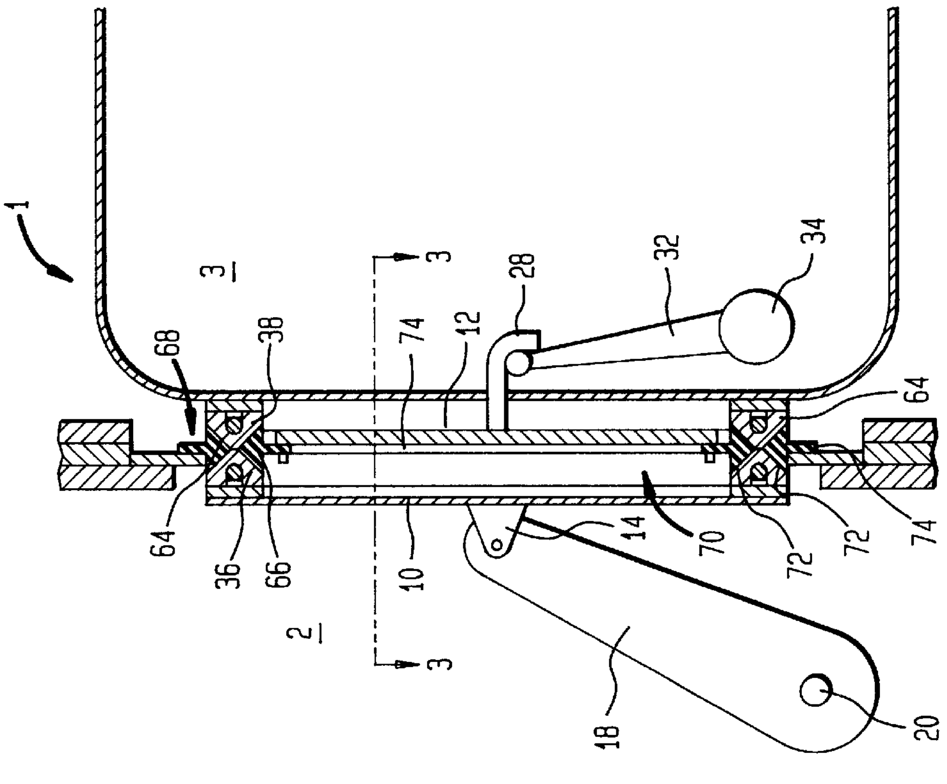
FIG. 2 is a fragmentary, sectional view of a transfer port system of the present invention shown in the docked position during initial contact of the first and second peripheral flanges.
Figure 1:
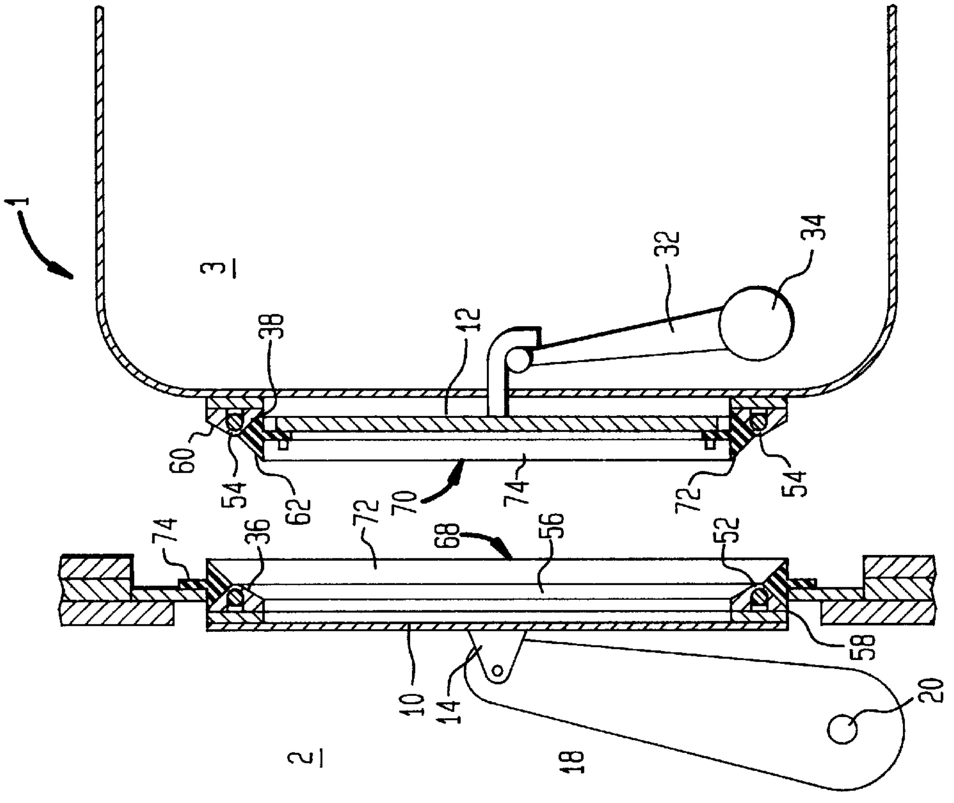
FIG. 1 is a sectional view of a transfer port mechanism of the present invention illustrated in the undocked position.
Figure 4:
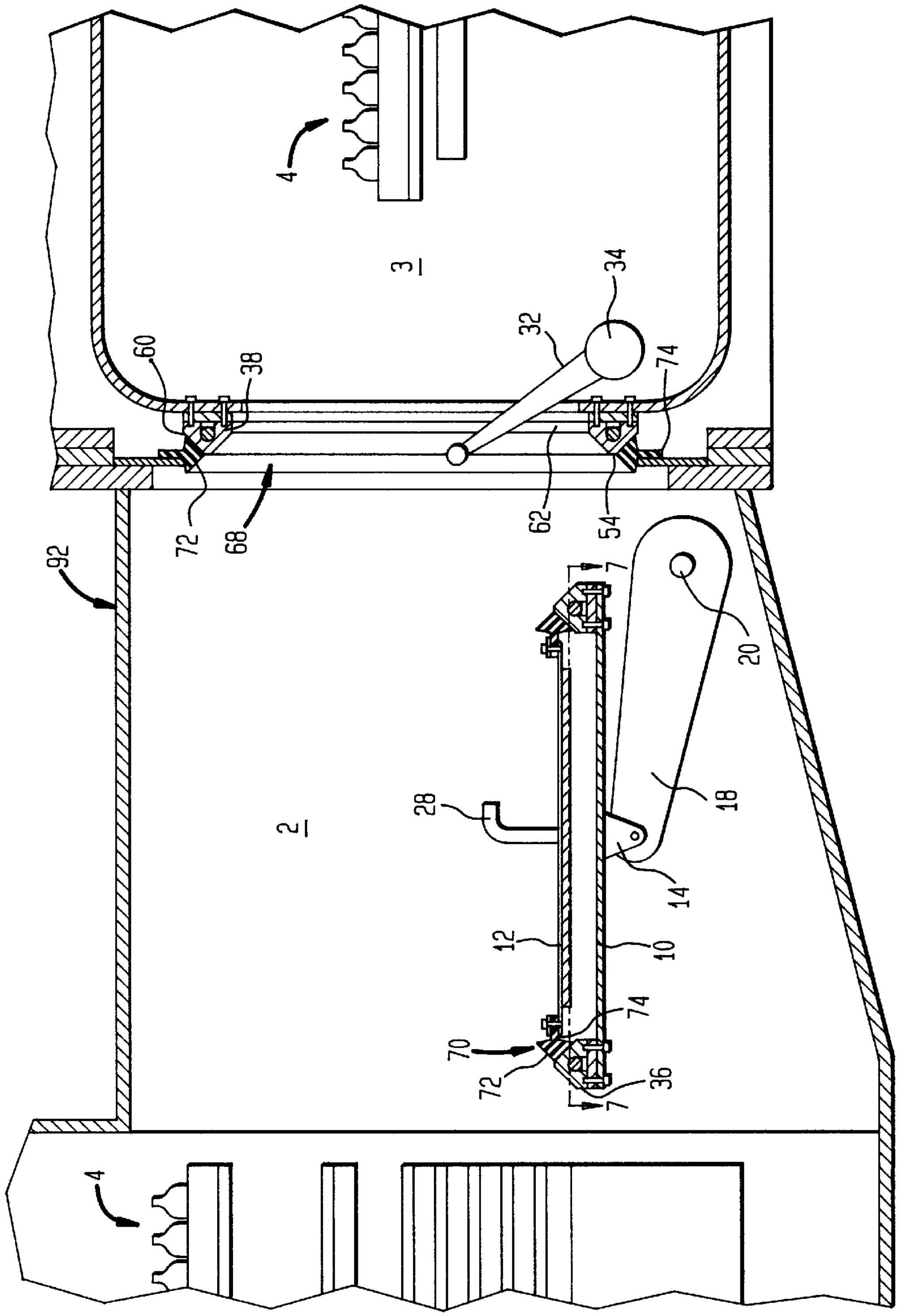
FIG. 4 is a fragmentary sectional view of the transfer port system illustrated in FIGS. 1 and 2 applied to a freeze dryer and transporter isolator with the doors shown in the open position.

As illustrated, sterile environments 2 and 3 from an undocked position (FIG. 1) are moved to a docked position, adjacent to one another (FIG. 2). Although not illustrated, sterile environment 3 (the transporter isolator) would be provided with a carriage adapted to ride in tracks leading up to sterile environment 2 (the freeze drier.) First and second doors 10 and 12 provide access to sterile environments 2 and 3. When sterile environments 2 and 3 are in the docked position, first and second doors 10 and 12 connect to one another and then, as a unit, pivot into sterile environment 2 to allow material to be transferred between the two sterile environments 2 and 3 (FIG. 4). The transporter isolator is an elongated container. In order to allow sterile environment 3 of the transporter isolator to interface with other sterile environment positioned opposite and 180 degrees from sterile environment 2, although not illustrated, provision can be made to enable the rotation of the complete transporter isolator together with its door 12.

Figure 3:
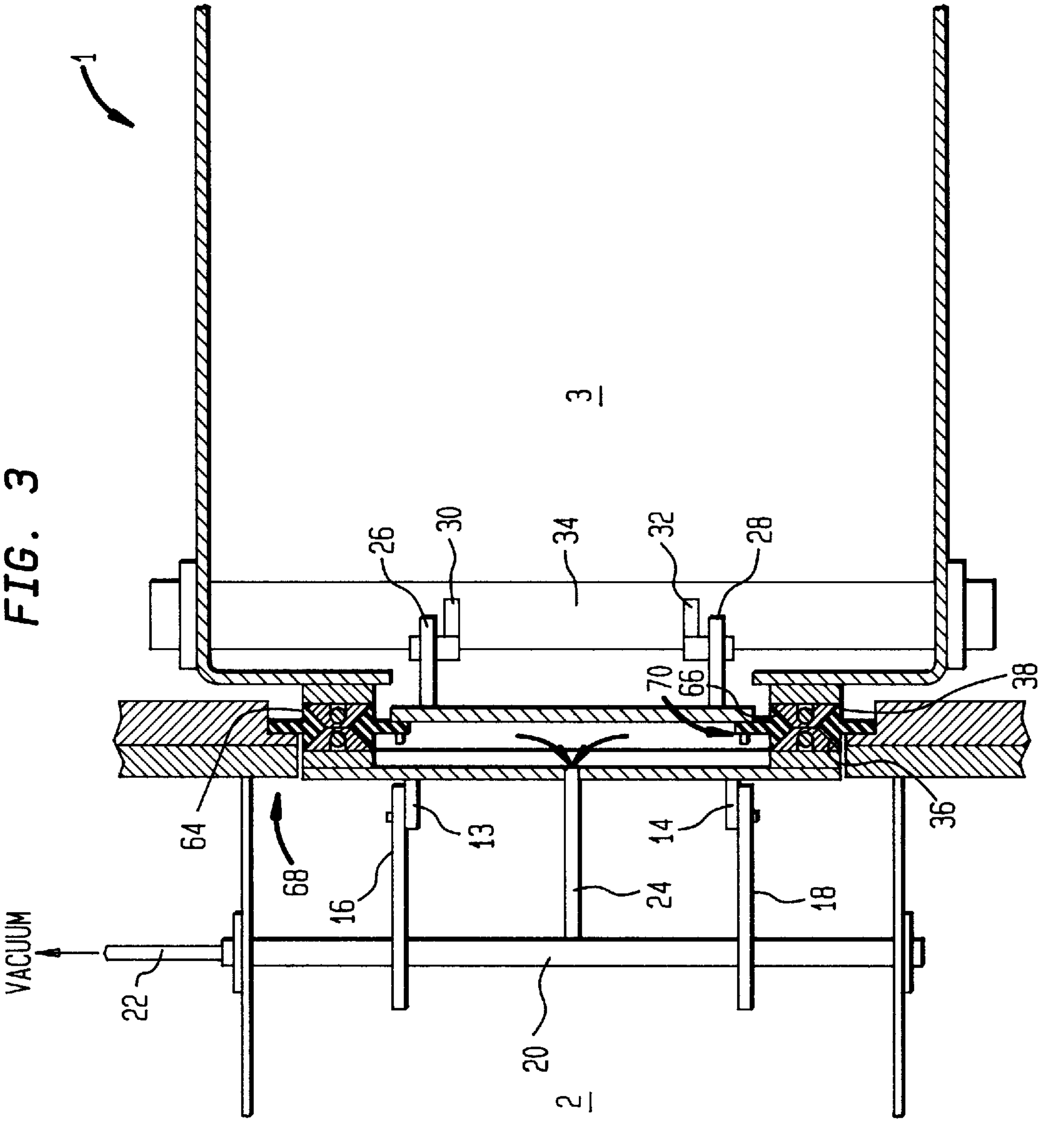
FIG. 3 is a sectional view taken along line 3—3 of FIG. 2.

With continued reference to FIG. 3, first door 10 is connected to crank-like arms 16 and 18 by pivots 13 and 14. Crank-like arms 16 and 18 are in turn connected to a stub shaft 20 which is hollow to permit a vacuum drawn through the axle and vacuum lines 22 and 24. As will be discussed it is the vacuum that connects first and second doors 10 and 12 to one another.

Second door 12 is secured in the closed position by two latch members 26 and 28 that engage with latch arms 30 and 32. Latch arms 30 and 32 are connected to an axle 34 which rotates in a counterclockwise direction to free second door 12 from sterile environment 3. The vacuum is drawn through a stub shaft 20 carrying a vacuum line 24 (when sterile environments are in the docked position, to connect first and second doors 10 and 12 to one another. With specific reference to FIG. 4, counterclockwise rotation of axle 34 opens latching members holding second door 12 in place and rotation of stub shaft 20 rotates crank-like members 16 and 18 in the counterclockwise direction and in turn rotating the assemblage of first and second doors 10 and 12 in the open direction. When first and second doors 10 and 12 are in the open position, material transfer is allowed between sterile environments 2 and 3.

Figure 5:
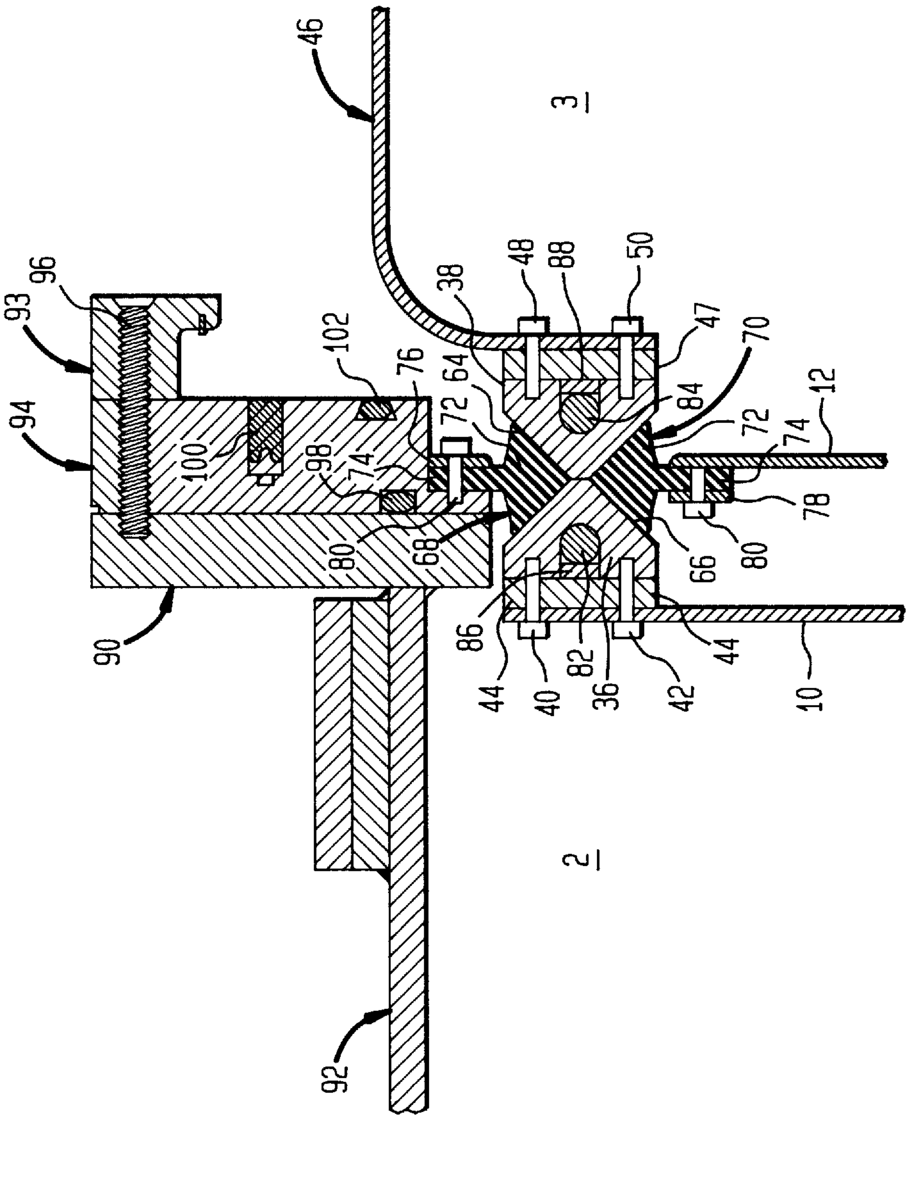
FIG. 5 is an enlarged fragmentary view of FIG. 3.

With additional reference to FIG. 5, first and second peripheral flanges 36 and 38 are respectively connected to the periphery of first door 10 and the periphery defining the opening to sterile environment 3. As can be appreciated, first and second peripheral flanges 36 and 38 when viewed in plan would approximate a frame-like rectangle having rounded corners. In this regard, see FIG. 7. First peripheral flange 36 is connected to first door 10 by means of studs 40 and 42 provided about the periphery of first peripheral flange 36. First peripheral flange 36 is insulated from first door 10 via an insulation pad 44. Second peripheral flange 38 is identical to first peripheral flange 36 and is connected to a wall 46 defining sterile environment 3. Second peripheral flange 38 is mounted on an insulation pad 47. The provision of studs 48 and 50, which are provided about the periphery of second peripheral flange 38, securely connect second peripheral flange 38 to wall 46. Each of insulation pad 44 and insulation pad 47 in a plan view would be seen to have a frame-like rectangle having rounded corners to match first and second peripheral flanges 36 and 38.

First and second peripheral flanges 36 and 38 have a transverse cross-section in the shape of an equilateral trapezoid. The shorter parallel side of this form defines an abutting surface 52 of first peripheral flange 36 which matches a matched abutting surface 54 of second peripheral. This can best be seen in FIG. 1 surfaces 56 and 58 (also best seen in FIG. 1) connect to abutting surface 52 and lateral sealing surfaces 60 and 62 connect to abutting surface 54 (is best seen in FIG. 4). When abutting surfaces 52 and 54 are in contact, which initially occurs during docking of sterile environments 2 and 3, outer and inner peripheral grooves 64 and 66 are formed.

Outer and inner gaskets 68 and 70 have sealing portions that seat within outer and inner peripheral grooves 64 and 66 and thus, seal against lateral sealing surfaces 56, 58, 60 and 62 of first and second peripheral flanges 36 and 38. As will be discussed, during this initial contact, surfaces of first and second peripheral flanges 36 and 38 and outer and inner gaskets 68 and 70 that were previously exposed to unsterile conditions are sterilized in place to allow first and second doors 10 and 12 to open.

Figure 6:
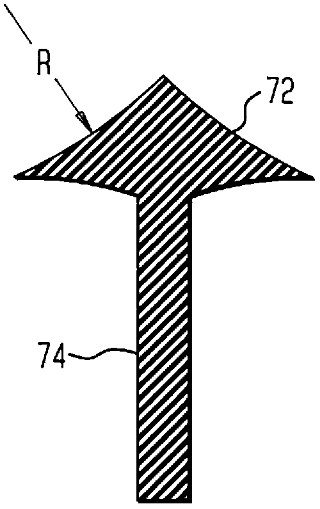
FIG. 6 is a cross-sectional view of a gasket in accordance with the present invention.

Each of the outer and inner gaskets 68 and 70 has connected head and base portions 72 and 74. Head portions 72 are of triangular cross-section and base portions 74 are of rectangular cross-section. The sealing portions of outer and inner gaskets 68 and 70 are formed by head portions 72 of outer and inner gaskets 68 and 70. With additional reference to FIG. 6, each of the head portions 72 is given a slight concavity as indicated by radius R so that head portions 72 of outer and inner gaskets 68 and 70 can be compressed between first and second peripheral flanges 36 and 38 in case of slight misalignment thereof during docking of the two sterile environments 2 and 3. By way of example, each of head portions 72 can be approximately 6 mm. in height, about 17.5 mm. in width and be provided with a radius R of about 25 mm. Each of first and second peripheral flanges can have a base of about 33 mm. in width with lateral sealing surfaces 56, 59 and 60, 62 sloping toward matched abutting surfaces 52 and 54, respectively, at about a 45 degree angle and a height of about 15 mm. It is to be noted that outer and inner gaskets 68 and 70 could be provided with ribs situated at the three apexes of the triangular cross-section of head portions 72.

Base portions 74 are of rectangular configuration to form flat strip-like sections that are used to anchor outer and inner gaskets 68 and 70 to a sealing flange 94 (discussed hereinafter) and second door 12. To this end, base portions 74 are held between clasp members 76 and 78 which are in turn connected to sealing flange 94 and second door 12 respectively by sets of studs 80. Each of clasp members 76 and 78 is of rectangular ring-like configuration with rounded comers to confirm to outer and inner gaskets 68 and 70.

In the exemplary gasket described above, a material is silicon rubber having a maximum rated temperature of about 315° C. and a hardness of Shore A 50. Other materials are possible.

When sterile environments 2 and 3 are in the undocked position, sterile environment 2 is sealed between first peripheral flange 36 and head portion 72 of outer gasket 68. This leaves an exposed surface of gasket 68 that is subjected to the ambient, unsterile environment as well as matched abutting surface 52 and lateral sealing surface 56 of first peripheral flange 36. At such time, sterile environment 3 is sealed between head portion 72 of inner gasket 70 and second peripheral flange 38. Thus, head portion 72, matched abutting surface 54, and lateral sealing surface 60 are also exposed to the ambient, unsterile environment. With specific reference back to FIG. 4, first and second doors 10 and 12 as a unit are swung into the open position to lie within sterile environment 2. Thus, if the previously exposed surfaces were not sterilized upon such initial contact, then, there would be no assurance that the two sterile environments 2 and 3 were not contaminated. Therefore, as will be discussed below, provision is made to heat first and second peripheral flanges 36 and 38 and outer and inner gaskets 68 and 70 to a sufficiently high temperature that sterile conditions are assured upon the opening of first and second doors 10 and 12.

Figure 7:
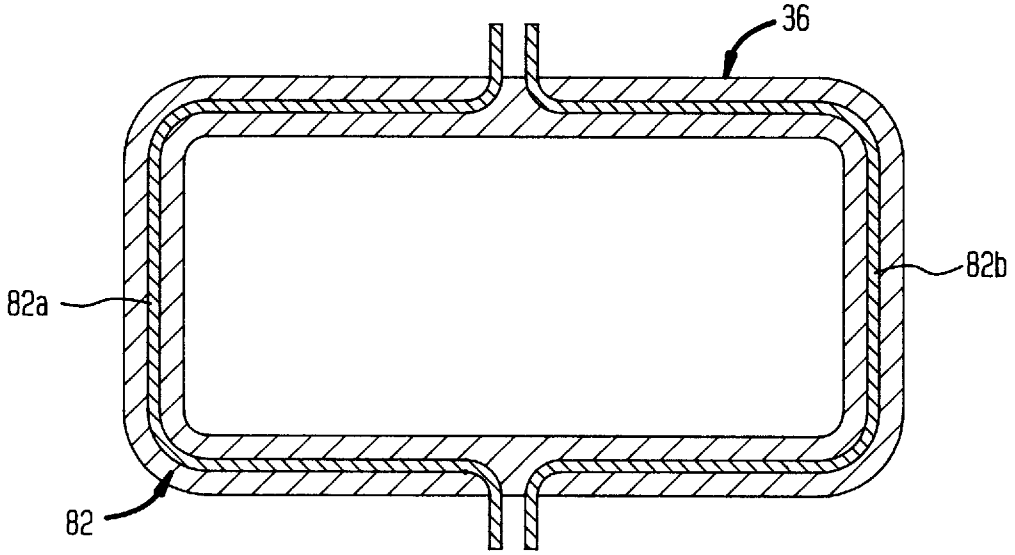
FIG. 7 is a sectional view taken along lines 7—7 of FIG. 4.

With additional reference to FIG. 7, cartridge-like or sheathed electrical heating elements 82 and 84 are provided to heat first and second peripheral flanges 36 and 38 and therefore, outer and inner gaskets 68 and 70. Current is continuously supplied to electrical heating elements so that the foregoing assemblage between loading operations maintained. at about 140°. Prior to loading the current is increased to attain a sterilizing temperature of about 220° C. During an initial period of about 30 seconds, when sterile environments are first docked, but prior to opening of first and second doors 10 and 12, the heating is continued. When first and second peripheral flanges 36 and 38 first come together a vacuum is drawn between first and second doors 10 and 12. In addition to its connection function, the vacuum acts to draw potential contaminants from between first and second doors 10 and 12 and out of the system. At the conclusion of the initial period, second door 12 is unlatched as described above and the first and second doors 10 and 12 as a unit swing or pivot into sterile environment 2.

In the illustrated embodiment each of heating elements 82 and 84 have a power output of about 4 Kw. Each heating element 82, 84 can be formed from two sections, for example, the illustrated sections 82*a* and 82*b* of heating element 82, to permit thermal expansion.

First and second peripheral flanges 36 and 38 are insulated in their mounting by pads 44 and 47. Backing pieces 86 and 88 of stainless steel may be provided to position heating elements 82 and 84 against first and second peripheral flanges 36 and 38. Due to the insulated mounting of heating elements 82 and 84 the power output thereof goes directly to sterilizing the previously unsterilized surfaces rather than also heating other components of transfer port system 1. Pad 44 additionally serves as a vacuum seal when first and second doors 10 and 12 are connected by vacuum. It is to be noted that first and second doors are formed by sheet material to lower the thermal mass of each of first and second doors 10 and 12. The insulation and such door construction permits the requisite temperature to be attained rapidly. In addition to the foregoing, it should be pointed out that such sheet metal construction adds flexibility to first and second doors 10 and 12 to enhance the ability of docking even with slight imperfections in flatness of outer and inner gaskets 68 and 70 and/or matched abutting surfaces 52 and 54.

The separation of sterile environments 2 and 3 is the reverse of the operation described above and throughout the time sterile environments 2 and 3 are docked sterile temperatures are maintained. It is to be noted that sterile environment 3 being a freeze drier can be steam sterilized to allow changing types or batches of medicants and the like. To this end, a frame 90 is connected to a wall 93 of freeze drier vestibule (the illustrated portion of sterile environment 2) to allow movement of a steam or slot door (not illustrated). Frame 90 has a slot-like flange 92 (within which the steam or slot door slides) that is connected to a sealing flange 94. Sealing flange 94 is in turn connected to frame 90. The assemblage of elements are held in place by studs of which stud 96 is illustrated. An interior gasket 98 is interposed between sealing flange 94 and frame 90 to seal sterile environment 2. Exterior gaskets 100 and 102 seal the steam door which vertically slides (down prior to steam sterilization and up thereafter) within slots of slot-like flange 92 in a guillotine-like manner.

While the present invention has been described with reference to a preferred embodiment, as will occur to those skilled in the art, numerous changes, additions and omissions may be made without departing from the spirit and scope of the present innovation.

We claim:

1. A transfer port system to allow material transfer between two sterile environments and through portals thereof, said two sterile environments having a docked position, adjacent to one another, with their said portals in alignment to allow said material transfer and an undocked position, separated from one another, said transfer port system comprising:

door means for providing access to said two sterile environments and including first and second doors having a closed position closing said two sterile environments and an open position with said first and second doors connected to one another and situated within one of the two sterile environments, thereby to allow said material transfer between said two sterile environments;

first and second peripheral flanges connected to said first door and the other of the two sterile environments, respectively, and positioned to initially contact one another when said two sterile environments are in the docked position;

said first and second peripheral flanges having matched abutting surfaces aligned with and in contact with one another during said initial contact of said first and second peripheral flanges and lateral surfaces connected to said matched abutting surfaces and shaped to form two opposed, outer and inner peripheral grooves when said matched abutting surfaces are in contact;

outer and inner gaskets having sealing portions configured to seat within said outer and inner grooves and to seal against said lateral sealing surfaces of said first and second peripheral flanges during said initial contact thereof;

said outer gasket connected to said one of said two sterile environments and said inner gasket connected to said second door so that when said first and second doors are in the closed position, said two sterile environments are sealed by said outer and inner gaskets at said first and second peripheral flanges, respectively, and when said two sterile environments are in the docked position, with said first and second doors in the open position, said outer gasket peripherally seals both of said two sterile environments at said second peripheral flange and said inner gasket peripherally seals said first and second doors to one another at said first peripheral flange;

heating means for heating said first and second flanges during their said initial contact, thereby to sterilize said lateral sealing and said matched abutting surfaces and said sealing portions of said outer and inner gaskets; and connection means for connecting said first and second doors to one another when said two sterile environments are in the docked position, thereby to allow movement of said first and second doors into said open position.

2. The transfer port system of claim 1, further comprising thermal insulation configured to thermally insulate said first and second peripheral flanges from said first door and the other of said two sterile environments.

3. The transfer port system of claim 2, wherein:

each of said first and second flanges has a transverse cross-section in the form of an equilateral trapezoid having parallel base and apex sides and lateral sides outwardly sloping from said apex side to said base sides, said apex side defining said matched abutting surfaces and said lateral sides defining said lateral sealing surfaces; and each of said outer and inner gaskets has connected head and base portions of respectively triangular and rectangular transverse-cross-sections; and said sealing portions of said outer and inner gaskets are formed by said head portions of said outer and inner gaskets.

4. The transfer port system of claim 3, wherein said head portion has concave side portions to seat within said grooves.

5. The transfer port system of claim 3, wherein said outer and inner gaskets are connected to said one of said two environments and said second door, respectively, by being clamped between peripheral clasping members at said base portions of said outer and inner gaskets.

6. The transfer port system of claim 3, wherein said heating means comprises electrical heating elements located within said first and second peripheral flanges.

7. The transfer port system of claim 3, wherein:

each of said first and second doors is formed by sheet-like material; and said connection means includes means for forming a vacuum between said first and second doors.

8. The transfer port system of claim 7, wherein said head portion has concave side portions to seat within said groves.

9. The transfer port system of claim 8, wherein said heating means comprises electrical heating elements located within said first and second peripheral flanges.

10. The transfer port system of claim 9, wherein said outer and inner gaskets are connected to said one of said two environments and said second door, respectively, by being clamped between peripheral clamping members at their said base portions.

* * * * *